United States Patent
Richter et al.

(10) Patent No.: US 10,559,391 B2
(45) Date of Patent: Feb. 11, 2020

(54) IRRADIATION TARGET PROCESSING SYSTEM

(71) Applicant: Framatome GmbH, Erlangen (DE)

(72) Inventors: Thomas Fabian Richter, Marloffstein (DE); Alexander Sykora, Nuremberg (DE); Wilfried Kannwischer, Hirschaid (DE); Leila Jaafar, Erlangen (DE)

(73) Assignee: FRAMATOME GMBH, Erlangen (DE)

( * ) Notice: Subject to any disclaimer, the term of this patent is extended or adjusted under 35 U.S.C. 154(b) by 235 days.

(21) Appl. No.: 15/549,234

(22) PCT Filed: Jan. 18, 2016

(86) PCT No.: PCT/EP2016/050893
§ 371 (c)(1),
(2) Date: Aug. 7, 2017

(87) PCT Pub. No.: WO2016/128177
PCT Pub. Date: Aug. 18, 2016

(65) Prior Publication Data
US 2018/0025803 A1 Jan. 25, 2018

(30) Foreign Application Priority Data

Feb. 9, 2015 (WO) ............... PCT/EP2015/052646
Apr. 30, 2015 (WO) ............... PCT/EP2015/059525
Jul. 21, 2015 (WO) ............... PCT/EP2015/066670

(51) Int. Cl.
*G21G 1/02* (2006.01)
*G21C 23/00* (2006.01)
*G21C 1/30* (2006.01)

(52) U.S. Cl.
CPC ............... *G21G 1/02* (2013.01); *G21C 23/00* (2013.01); *G21C 1/303* (2013.01); *G21C 1/306* (2013.01)

(58) Field of Classification Search
CPC ........ G21C 23/00; G21C 1/303; G21C 1/306; G21G 1/02
See application file for complete search history.

(56) References Cited

U.S. PATENT DOCUMENTS 3,263,081 A 7/1966 Wiesemann et al.
3,284,306 A * 11/1966 Balla ..................... G21C 1/303
376/344

(Continued)

FOREIGN PATENT DOCUMENTS

CN 101483072 A 7/2009
CN 101582299 A 11/2009

(Continued)

OTHER PUBLICATIONS

International Search Report issued in the PCT Priority Application No. PCT/EP2015/059525 dated Jan. 22, 2016.

(Continued)

*Primary Examiner* — Sharon M Davis
(74) *Attorney, Agent, or Firm* — Dilworth IP, LLC

(57) ABSTRACT

An irradiation target processing system for insertion and retrieving irradiation targets into and from an instrumentation tube in a nuclear reactor core comprises, a target retrieving system, target insertion system and transport gas supply system, mounted on a movable support, wherein: the target retrieving system comprises a target exit port coupled to a target storage container and exhaust system; the target insertion system comprises a target filling device, target retention tubing with target supply junction connectable to the instrumentation tube, and a target diverter coupled to the target filling device, target retention tubing and target (Continued)

retrieving system; and the transport gas supply system comprises a first gas supply tubing coupled to the exit port of the target retrieving system, a second gas supply tubing coupled to a junction for supplying gas to the instrumentation tube, and a transport gas supply junction coupled to the first and second gas supply tubing.

19 Claims, 7 Drawing Sheets

(56) References Cited

U.S. PATENT DOCUMENTS

| | | |
|---|---|---|
| 8,050,377 B2 | 11/2011 | Russell, II et al. |
| 8,885,791 B2 | 11/2014 | Russell, II et al. |
| 2003/0183991 A1 | 10/2003 | Hideki et al. |
| 2009/0274260 A1 | 11/2009 | Russell, II et al. |
| 2013/0170927 A1 | 7/2013 | Dayal et al. |
| 2013/0177118 A1 | 7/2013 | Heinold et al. |
| 2013/0177125 A1 | 7/2013 | Heinold et al. |
| 2013/0223578 A1 | 8/2013 | Russell, II et al. |
| 2013/0315361 A1 | 11/2013 | Berger et al. |
| 2014/0307844 A1 | 10/2014 | Russell, II et al. |

FOREIGN PATENT DOCUMENTS

| | | |
|---|---|---|
| CN | 101628811 A | 1/2010 |
| EP | 2093773 A2 | 8/2009 |
| GB | 1324380 A | 7/1973 |
| WO | 2014107218 A2 | 7/2014 |

OTHER PUBLICATIONS

PCT International Search Report and Written Opinion dated Apr. 13, 2016 from corresponding Application No. PCT/EP2016/050893.

International Search Report issued in PCT International Application No. PCT/EP2015/051842 dated Oct. 12, 2015.

International Search Report issued in PCT International Application No. PCT/EP2015/051844 dated Sep. 29, 2015.

* cited by examiner

IRRADIATION TARGET PROCESSING SYSTEM

FIELD OF THE INVENTION

The invention relates to an irradiation target processing system, and in particular to a system for insertion and retrieving irradiation targets into and from an instrumentation tube in a nuclear reactor core.

BACKGROUND

Radioactive nuclides are used in various fields of technology and science, as well as for medical purposes. These radionuclides are produced in research reactors or cyclotrons. However, since the number of facilities for commercial production of radionuclides is limited already and expected to decrease, it is desired to provide alternative production sites.

The neutron flux density in the core of a commercial nuclear reactor is measured, inter alia, by introducing solid spherical probes into instrumentation tubes passing through the reactor core. It was therefore suggested that instrumentation tubes of commercial nuclear reactors shall be used for producing radionuclides when the reactor is in power generating operation. In particular, one or more instrumentation tubes of an aero-ball measuring system of a commercial nuclear reactor can be used, and existing components of the ball measuring system can be modified and/or supplemented to enable an effective production of radionuclides during reactor operation.

EP 2 093 773 A2 suggests that existing instrumentation tubes conventionally used for housing neutron detectors may be used to generate radionuclides during normal operation of a commercial nuclear reactor. In particular, spherical irradiation targets are linearly pushed into and removed from the instrumentation tubes. Based on the axial neutron flux profile of the reactor core, the optimum position and exposure time of the targets in the reactor core are determined. A driving gear system is used for moving and holding the irradiation targets in the instrumentation tubes.

US 2013/0177118 A1 discloses a system that allows irradiation targets to be irradiated in a nuclear reactor and deposited in a harvestable configuration without direct human interaction or discontinuation of power-producing activities. The system includes accessible end-points that store desired produced isotopes for handling and/or shipping. A penetration pathway can provide access through an access barrier in the reactor containment and to an instrumentation tube in the reactor vessel. The system further comprises a diverter, a driving mechanism, an indexer and a harvesting cask which can all be located inside of a containment building in the nuclear plant. A Cask tube provides a pathway for irradiation targets to pass out of a diverter and may include one or more counters that detect an exact number, amount, or activity of activated irradiation targets that exit through the cask tube. An exhaust line is connected to the cask tube which allows a pneumatic fluid used to drive irradiation targets to safely exit the system. The cask tube may be used with multiple storage casks based on target properties. One or more stops may be inserted into the cask tube at desired positions to separate out a certain population of irradiation targets.

US 2013/0177125 A1 is directed to a system for managing irradiation targets and instrumentation access to a nuclear reactor, the system comprising: a penetration pathway connecting an origin point outside an access barrier of the nuclear reactor to an instrumentation tube extending into the nuclear reactor inside the access barrier, wherein the penetration pathway is traversable by at least one irradiation target, wherein the penetration pathway includes one of at least one instrumentation path and at least one irradiation target path distinct from the instrumentation path, and at least one shared path; and a selector configured to connect only one of the instrumentation path and the irradiation target path to the shared path so as to form the penetration pathway. The selector includes a selection block coupled to at least one motor and provides several different pathways, depending on its position. Based on the vertical positioning of selection block, only one of the instrumentation path and the irradiation target path may align with, and open into, shared pathway headed toward an instrumentation tube.

US 2013/0170927 A1 discloses apparatuses and methods for producing radioisotopes in instrumentation tubes of operating commercial nuclear reactors. Irradiation targets are inserted and removed from instrumentation tubes during operation and converted to radioisotopes. A harvesting cask and/or a cask tube can be equipped with a target counter that counts or measures properties of irradiation targets moving into the harvesting cask. The irradiation targets may further include a tracking target located at a known position among all other targets that is fabricated of a material that is different from all other targets and permits tracking or locating of the irradiation targets. Several combinations of forks, dividers, turntables and sorters may be used to create unique loading and harvesting paths for the irradiation targets.

US 2013/0315361 A1 also relates to an apparatus and methods for producing radioisotopes in multiple instrumentation tubes of operating commercial nuclear reactors. Irradiation targets are inserted and removed from multiple instrumentation tubes and converted to radioisotopes during operation of the nuclear reactor. An indexer is provided to selectively direct irradiation targets to one of the multiple instrumentation tubes within nuclear reactor by making accessible a penetration pathway leading to the individual instrumentation tube. The indexer may further selectively allow irradiation targets from multiple instrumentation tubes to enter into a single/combined penetration pathway leading to harvesting points outside of an access barrier. Positioning irradiation targets are provided to properly position other irradiation targets at desired positions within or near the nuclear core. The positioning targets can be made of an inexpensive inert material or of a magnetic material, and may be held in the instrumentation tube by means of a magnetic latch. After irradiation, the targets are delivered from the instrumentation tube into a harvesting cask, and the positioning targets may be sorted out from the harvesting cask due to their markings or physical properties.

Conventional aero-ball measuring systems are known in the art and disclosed, for example, in GB 1 324 380 A and U.S. Pat. No. 3,263,081 A.

The above radionuclide generation systems require structures for processing activated irradiation targets which are permanently installed in the reactor facilities. However, installing such permanent radionuclide generation systems will involve high costs. In addition, the systems may require that one or more specific instrumentation tubes are selected for radionuclide generation. These instrumentation tubes will no longer be available for in-core measurement of neutron flux or other reactor conditions. Moreover, neutron flux in the reactor core will vary depending on reactor load and operating conditions. Therefore, the neutron flux at the specific instrumentation tube selected for radionuclide generation may be insufficient resulting in high downtimes, or radionuclide generation may require extended process times.

Further, due to the high activity of the activated irradiation targets retrieved from the instrumentation tubes, and since space within the reactor containment is limited, the targets are difficult to process. In particular, the activated targets including the radioactive nuclides must be filled into and stored in containers provided with heavy radiation shielding. However, the chambers for the Traversing Incore Probe (TIP) system and/or aero-ball measuring system do not have any structures for packaging and transporting those heavy containers. Provision of additional water locks in the reactor containment for handling of the activated targets and shielded containers would also be too expensive.

SUMMARY OF THE INVENTION

It is an object of the invention to provide a system for radionuclide generation from irradiation targets inserted into an instrumentation tube of a nuclear reactor core, such as the instrumentation tube of an aero-ball measuring system or a Traversing Incore Probe (TIP) system of a commercial nuclear reactor, or a view port of a CANDU reactor, which allows for an effective and economical radionuclide production during reactor operation.

In particular, it is an object of the invention to provide a system for inserting and retrieving irradiation targets into and from an instrumentation tube of a nuclear reactor which allows for an easy processing of the irradiation targets at reduced costs, and it is a further object to provide a system for processing irradiation targets which can be used within existing structures in accessible areas of the reactor containment.

The above objects are solved by an irradiation target processing system according to claim 1. Advantageous and expedient embodiments of the invention are indicated in the dependent claims which can be combined with each other independently.

In a first aspect, the invention provides an irradiation target processing system for insertion and retrieving irradiation targets into and from an instrumentation tube in a nuclear reactor core, the system comprising a target retrieving system comprising a target exit port configured to be coupled to a target storage container and an exhaust system;

a target insertion system comprising a target filling device, a target retention tubing and a target diverter coupled to the target filling device, the target retention tubing and the target retrieving system, and further comprising a target supply junction at the target retention tubing, wherein the target supply junction is configured to be connected to the instrumentation tube; and a transport gas supply system comprising a first gas supply tubing, a second gas supply tubing and a transport gas supply junction coupled to the first and second gas supply tubing, wherein the first gas supply tubing is coupled to the exit port of the target retrieving system and the second gas supply tubing is configured to be coupled to an instrumentation tube gas supply junction; and wherein the target retrieving system, the target insertion system and the transport gas supply system are mounted on a movable support.

According to the invention, a mobile system is used for processing irradiation targets in one or more instrumentation tubes of an already existing aero-ball measuring system or other in-core measurement system of a commercial nuclear reactor during power generating operation, or in new tubes inserted in openings of the reactor inside or nearby the reactor pressure vessel, such as view ports of a CANDU reactor. The mobile system allows safe insertion of irradiation targets into and retrieving activated irradiation targets from varying instrumentation tubes using pneumatic force and gravity. The mobile target processing system comprises connection interfaces for coupling system components to the instrumentation tubes and an external exhaust air system, and optionally to an external gas supply. The mobile target processing system may further comprise a mechanism that allows for unloading a specific amount of irradiation targets into a radiation shielded storage container with limited emission of aerosols.

The invention provides a simple and cost effective system for the processing of irradiation targets for radionuclide generation. The essential components of the target processing system are provided on a mobile support, and can be connected to the existing aero-ball measuring system or any other in-core measuring system, or to new tubes inserted in openings of the reactor inside or nearby the reactor pressure vessel, such as view ports of a CANDU reactor, if and at the time when the production of artificial radioactive nuclides is desired. Accordingly, only small modifications of the already existing in-core measuring systems are required. The target processing system also allows for selecting and changing between specific instrumentation tubes for the purpose of radionuclide generation, depending on the status of the reactor and the actual neutron flux conditions in the reactor core at the specific instrumentation tube. Thus, the invention enables an upgrade of available instrumentation tubes for radionuclide generation at low costs, without the need of a permanent installation of a radionuclide generation system. Since the system can be stored outside the reactor containment if no radionuclide generation is desired, less space is required within the containment. Mobile systems also easier fulfill safety requirements such as stability on seismic events.

According to a preferred embodiment of the irradiation target processing system, the target retrieving system comprises a discharge tube having a lock element for blocking movement of the irradiation targets into the exit port. Preferably, the lock element comprises a locking pin.

The discharge tube of the target retrieving system is configured to receive activated irradiation targets from the instrumentation tube extending into and optionally through the nuclear reactor core. More preferably, the discharge tube has an inverse U-shaped tube section, which can be used for portioning and unloading a specific amount of irradiation targets. The inverse U-shaped section of the discharge tube forms an apex dividing the discharge tube into a first section proximate the exit port and a second section heading towards the instrumentation tube.

Preferably, the lock element is provided in the first discharge tube section adjacent the exit port to block movement of the activated irradiation targets out of the discharge tube.

Activated irradiation targets retrieved from the instrumentation tube and passed into the discharge tube are held in the discharge tube by the lock element, and are separated by the apex into a predefined quantity to be released from the discharge tube and a further quantity of activated targets to be kept in the discharge tube or target retention tubing. One of a number of shielded storage containers can be coupled to the exit port, preferably at a junction provided at a free end of the exit port. When the lock element is opened, the predefined quantity of the activated targets can leave the discharge tube driven by gravity, and is collected in the shielded storage container. The quantity of activated targets leaving the discharge tube is determined by the length of the target column in the first discharge tube section.

Since only a predefined quantity of the activated targets having a predetermined lower activity is released from the target retrieving system and stored in the shielded container, much smaller containers with less radiation shielding can be used which are easy to be transported either manually or by means of existing handling structures within the reactor containment.

Preferably, the discharge tube comprises a sensor to determine target activity. Providing a sensor allows for determining the presence of activated irradiation targets vis-a-vis positioning targets and further allows for controlling runtime and monitoring the quantity of activated targets released from the discharge tube.

Still preferably, the target retrieving system comprises at least one magnet preferably movably arranged at the discharge tube for separating magnetic targets from non-magnetic targets. More preferably, the magnet can be used to select and separate activated irradiation targets from positioning targets in the discharge tube. The positioning targets are made from an inert material and may be used to achieve a proper axial positioning of the irradiation targets in the nuclear reactor core. Most preferably, one of the irradiation targets and the positioning targets is ferromagnetic whereas the other one of the irradiation targets and positioning targets is non-magnetic or paramagnetic.

The at least one magnet may be selected from a permanent magnet and a solenoid. Preferably, the at least one magnet is movable along the first discharge tube section so as to selectively expose ferromagnetic targets to a magnetic field and retain the ferromagnetic targets in the discharge tube.

The discharge tube can be connected to a vibrator for releasing blocked irradiation targets. This facilitates a safe processing of the activated irradiation targets, and further enables cleaning of the discharge tube from particulate matter.

The exit port of the target retrieving system preferably comprises a ball valve coupled to the first gas supply tubing and the exhaust system. The ball valve is configured for discharging gas out of the discharge tube, and for releasing the activated irradiation targets from the discharge tube through the exit port into the storage container under the action of gravity. Providing the ball valve for discharging gas out of the discharge tube guarantees that no radioactive aerosols are released into the reactor containment during target transport and retrieval from the discharge tube.

Preferably, an exhaust gas tube is connected to the ball valve and the exhaust system, and comprises a shut-off valve downstream of the ball valve. More preferably, the exhaust gas tube includes a junction for coupling the ball valve of the exit port to the exhaust system.

The target insertion system of the irradiation target processing system according to the invention comprises a target filling device, a target retention tubing, and a target diverter coupled to the target filling device, the target retention tubing and the target retrieving system.

The target filling device is configured to provide a source of irradiation targets and optionally positioning targets which are to be inserted into the instrumentation tube. Preferably, the target filling device comprises one of a funnel for manual insertion or a cartridge including a plurality of irradiation targets and/or positioning targets. More preferably, the cartridge is connected to a gas supply which can be opened and closed by a valve to insert the new targets automatically. The cartridge can be connected to the pneumatic gas supply system by a controlled valve. This enables the automatic insertion of targets into the instrumentation tube. The cartridge including the non-yet activated irradiation targets is installed to the processing system prior to retrieving of the activated targets from the instrumentation tube.

The target diverter preferably is configured to select between a passage from the target filling device to the retention tubing, and a passage from the retention tubing to the discharge tube.

Preferably, the target retention tubing is adapted to accommodate all irradiation targets inserted into or retrieved from the instrumentation tube.

More preferably, the retention tubing is arranged in the form of a helix wherein the lower end of the helix, opposite the target diverter, is heading towards the instrumentation tube or the reactor core.

Still more preferably, the target retention tubing comprises an ascending tube section and a locking element at an upper end of the ascending tube section for blocking movement of the irradiation targets into the instrumentation tube. This minimizes the risk of damaging the instrumentation tube during target processing.

Still more preferably, the target retention tubing comprises a sensor to determine at least one of target activity, target transport time, target quantity and target magnetic properties.

The target insertion system further comprises a target supply junction at the target retention tubing, wherein the target supply junction is configured to be connected to the instrumentation tube. Preferably, the target supply junction is arranged at a free end of the retention tubing, adjacent to the locking element at the upper end of the ascending tube section of the retention tubing.

The first gas supply tubing of the transport gas supply system is coupled to the exit port of the target retrieving system, and is configured to supply pressurized gas for transporting activated irradiation targets from the discharge tube into the retention tubing, and transporting irradiation targets from the retention tubing into the instrumentation tube for radionuclide generation.

The second gas supply tubing of the transport gas supply system is configured to be coupled to an instrumentation tube gas supply junction, and is used to provide pressurized gas to the instrumentation tube for retrieving activated irradiation targets from the instrumentation tube and passing the activated irradiation targets into the retention tubing and/or the discharge tube.

The transport gas supply system preferably comprises a compressed gas cylinder connected to the transport gas supply junction. Alternatively, the transport gas supply junction may be coupled to an external source of pressurized gas, such as the gas supply of an existing aero-ball measuring system.

The first and second gas supply tubing preferably comprise a shut-off valve which may serve to block any gas supply to the irradiation target processing system, and which may also be used to select between target insertion and target retrieving operations.

Alternatively, the first and second gas supply tubing may each comprise a directional control valve, preferably a 3/2 directional control valve. Preferably, the directional control valve in the first gas supply tubing connects the first gas supply tubing to the exit port and an exhaust tube heading to the exhaust system. The directional control valve in the second gas supply tubing preferably is configured to connect the second gas supply tubing to a bypass conduit heading to the exhaust system and the first gas supply tubing.

The irradiation target processing system may further comprise an interface to be coupled to an instrumentation control unit and/or online core monitoring system for monitoring and controlling operation of the system components.

In a further aspect, the invention relates to use of the irradiation target processing system for upgrading an existing commercial nuclear power reactor having at least one instrumentation tube extending into and optionally through a reactor core for radionuclide generation, or which is located nearby the reactor core where the neutron flux is still sufficient for for radionuclide generation. The invention thus provides an easy retrofit solution for radionuclide generation at low costs and with minimal modifications of safety proven existing measurement systems already embedded in commercial nuclear power reactors.

Preferably, the irradiation target processing system is used to insert and retrieve irradiation targets into and from a selected one of a plurality of instrumentation tubes. More preferably, the irradiation target processing system is used to insert and retrieve irradiation targets into and from a selected one of a plurality of instrumentation tubes in a first step of radionuclide generation, and is used to insert and retrieve irradiation targets into and from another one of the plurality of instrumentation tubes in a subsequent step of radionuclide generation.

BRIEF DESCRIPTION OF THE DRAWINGS

Further features and advantages of the invention will become more apparent from the following description of preferred embodiments and from the accompanying drawings wherein like elements are represented by like numerals. The preferred embodiments are given by way of illustration only and are not intended to limit the scope of the invention which is apparent from the attached claims.

In the drawings.

DETAILED DESCRIPTION OF THE INVENTION

The invention contemplates that a commercial nuclear reactor can be used for producing artificial radioisotopes or radionuclides, during reactor operation. In particular, conventional aero-ball measuring systems or other measuring systems comprising instrumentation tubes extending into and/or through the reactor core of the commercial reactor can be modified and/or supplemented to enable an effective and efficient production of radionuclides, when the reactor is in an energy generating mode.

Some of the guide tubes for example of a commercial aero-ball measuring system or Traversing Incore Probe (TIP) system are used to guide the irradiation targets into an instrumentation tube in the reactor core and to lead the activated irradiation targets out of the reactor core. The activation of the targets is optimized by positioning the irradiation targets in predetermined areas of the reactor core having a neutron flux sufficient for converting a parent material in the irradiation targets completely into the desired radionuclide.

The proper positioning of the irradiation targets may be achieved by means of positioning targets made of an inert material and sequencing the positioning targets and the irradiation targets so as to form a column of the targets in the instrumentation tube wherein the irradiation targets are at a pre-calculated optimum axial position in the reactor core and the other positions are occupied by the inert positioning targets or remain empty. Preferably, the irradiation targets and the inert targets have different magnetic properties. The inert targets may be made of a stable, magnetic material which does not have any influence on the irradiation target material.

Figure 1:
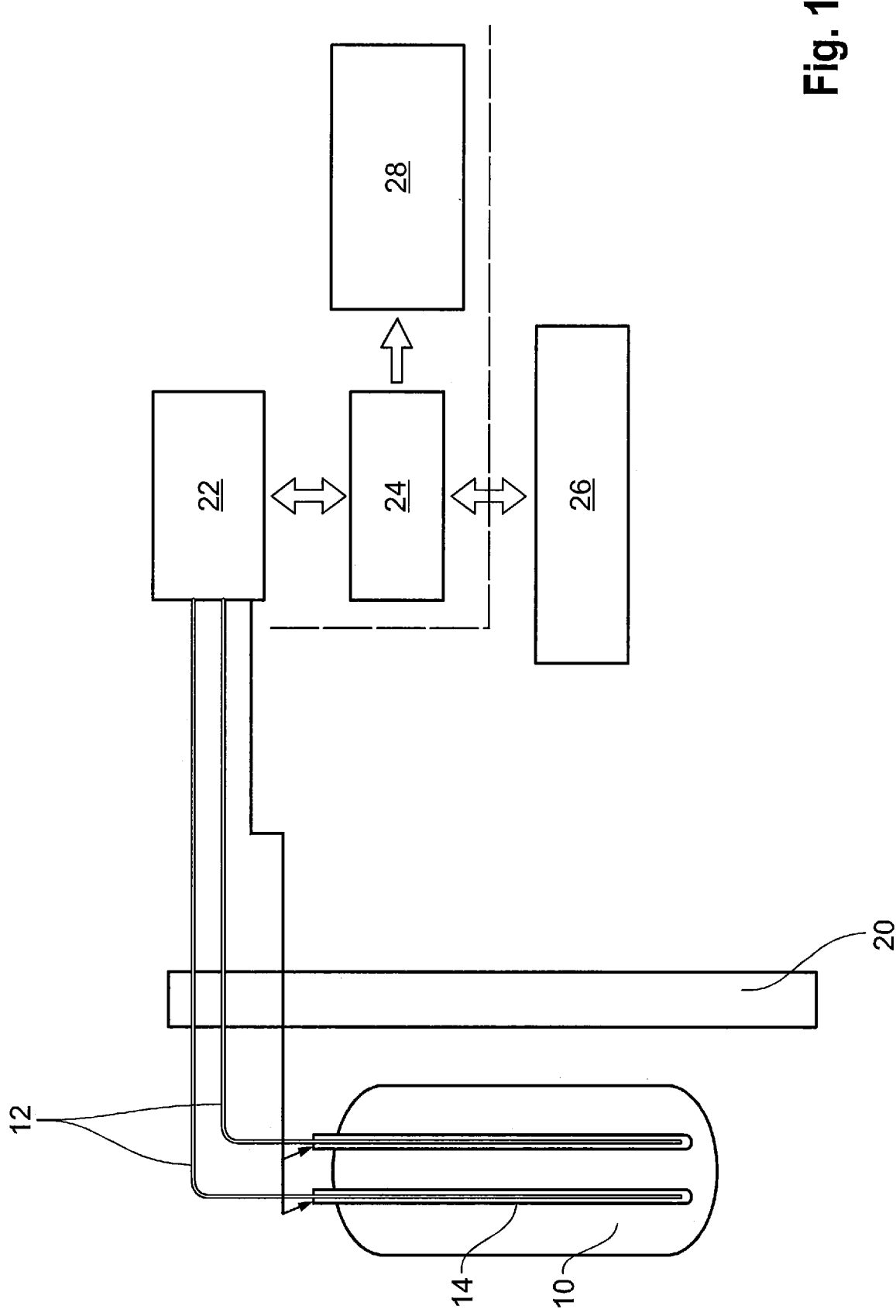
FIG. 1 shows a schematic sketch of a radionuclide generation system setup.

FIG. 1 illustrates the basic setup of a radionuclide generation system within a commercial nuclear power plant. As opposed to a research reactor, the purpose of a commercial nuclear reactor is the production of electrical power. Commercial nuclear reactors typically have a power rating of 100+ Megawatt electric.

The basis of the radionuclide generation system described in the example embodiments is derived from a conventional aero-ball measuring system used to measure the neutron flux density in the core of the nuclear reactor. A plurality of aero-balls are arranged in a linear order thereby forming an aero-ball column in the instrumentation tube. The aero-balls are substantially spherical or round probes but can have other forms such as ellipsoids or cylinders, as long as they are capable of moving through the conduits of the measuring system. The aero-ball measuring system includes a pneumatically operated drive system configured to insert the aero-balls into an instrumentation tube extending into and passing the reactor core through its entire axial length, and to remove the aero-balls from the instrumentation tube after activation.

The radionuclide generating system of the present invention can be built as a stand-alone system that is linked to an unmodified instrumentation tube of a regular aero-ball measuring system. The irradiation target processing system of the present invention includes most of the components of the radionuclide generation system which are provided on a movable support, and which are only temporarily attached to the instrumentation tube during target insertion and retrieval. Thus, no permanent modification of the existing aero-ball measuring system is required.

Referring to FIG. 1, a commercial nuclear reactor comprises one or more guide tubes 12 linked to least one instrumentation tube 14 passing through a core 10 of the nuclear reactor. The guide tube 12 is configured to permit insertion and removal of aero-balls as well as of irradiation targets 16 and optionally positioning targets 18 (cf. FIG. 2) into and from the instrumentation tube 14.

The aero-ball measuring system of the commercial nuclear reactor is adapted to handle irradiation targets 16 having a round, cylindrical, elliptical or spherical shape and having a diameter corresponding to the clearance of the instrumentation tube 12 of the aero-ball measuring system. Preferably, the diameter of the targets 16, 18 is in the range of between 1 to 3 mm, preferably about 1.7 mm.

Guide tubes 12 penetrate an access barrier 20 of the reactor and are coupled to one or more instrumentation tubes 14. Preferably, the instrumentation tube 12 penetrates the pressure vessel cover of the nuclear reactor, with the instrumentation tube 14 extending from the top to the bottom over substantially the entire axial length of the reactor core 10. An end of the instrumentation tube 14 at the bottom of the reactor core 10 is closed and/or provided with a stop so that the irradiation targets 16 inserted into the instrumentation tube 12 form a column wherein each target 16 is at a predefined axial position in the reactor core 10.

Preferably, one or more humidity sensors (not shown) may be provided at the guide tubes 12 to detect any ingress of primary coolant or any other liquid. It is understood that the instrumentation tubes 14 are in direct contact with the primary coolant surrounding fuel elements in the core of the nuclear reactor. The humidity sensors may be based on spark plugs which are modified for measuring electrical resistance.

According to a preferred embodiment, the commercial nuclear reactor is a pressurized water reactor. More preferably, the instrumentation tubes 12 are those of a conventional aero-ball measuring system of a pressurized water reactor (PWR) such as an EPR™ or Siemens™ PWR nuclear reactor.

The person skilled in the art will however recognize that the invention is not limited to use of an aero-ball measuring system of a PWR reactor. Rather, it is also possible to use the instrumentation tubes of a Traversing Incore Probe system of a boiling water reactor (BWR), the view ports of a CANDU reactor and temperature measurement and/or neutron flux channels in a heavy water reactor.

As shown in FIG. 1, the guide tubes 12 are connected to irradiation target processing system 22 configured to insert the irradiation targets 16 and optionally positioning targets 18 into the instrumentation tube 14 in a predetermined linear order, and to retrieve the activated irradiation targets 16 and positioning targets 18 from the instrumentation tube 14 thereby retaining the linear order of the targets.

The irradiation target processing system 22 is pneumatically operated allowing for a fast and safety proven processing of the irradiation targets 16 and optionally the positioning targets 18 using pressurized gas such as nitrogen or air.

The target processing system 22 comprises a target retrieving system configured to receive activated irradiation targets 16 and optionally positioning targets 18 from the instrumentation tube 14 and pass a pre-defined quantity of the activated irradiation targets into a radiation shielded storage container. The target retrieving system will be described in greater detail below, with reference to FIG. 3.

With further reference to FIG. 1, an instrumentation and control unit (ICU) 24 is connected to the target processing system 22 as well as an online core monitoring system 26 for controlling activation of the irradiation targets 16. Preferably, the ICU 24 is also connected to a fault monitoring system 28 of the aero-ball measuring system for reporting any system errors.

According to a preferred embodiment, the core monitoring system 26 and the instrumentation and control unit 24 are configured such that the activation process for converting the irradiation targets 16 to the desired radionuclide is optimized by considering the actual state of the reactor, especially the current neutron flux, fuel burn-up, reactor power and/or loading. Thus, an optimum axial irradiation position and irradiation time can be calculated for optimum results. It is however not important whether the actual calculation is performed in the ICU 24 or by the core monitoring system 26 of the aero-ball measuring system.

The ICU 24 is connected to the online core monitoring system 26 software via an interface. The software is configured to calculate the required irradiation time for the targets online according to the actual neutron flux. The target processing system 22 is operated by the ICU 24. Start/Stop signals for target activation are exchanged between both systems. The ICU 24 is further connected to the mechanical components of the target processing system 22, including the sensors. The online core monitoring system 26 of the conventional aero-ball measuring system, such as the POWERTRAX/S™ core monitoring software system available from Areva™, is able to provide substantially all relevant input data for the calculation of optimum activation conditions necessary for an efficient generation of radionuclides.

Preferably, the information provided by the core monitoring system 26 to the instrumentation and control unit 24 includes at least one of the following: neutron flux (from ex- or in-core detectors), activation values from an existing aero-ball measuring system, burn-up, reactor power, loading, rod position(s), flow rate, inlet-temperature, pressure, and time synchronization. The more information about the reactor is considered as input data, the more accurate will be the results of the calculation of the optimum axial irradiation position and irradiation time. The before mentioned parameters may include real-time values and any derivatives, like developments over a pre-defined period of time.

The information obtained from the core monitoring system 26 may also be used in the ICU 24 to calculate other parameters such as the amount of irradiation targets 16 in a selected instrumentation tube 14 defining the actual length of the respective target column, and the positions of the individual irradiation targets 16 and optionally positioning targets 18 within the target column. Based on the results of the calculations, the ICU 24 and/or an operator will operate the mechanical components of the target processing system 22.

In a preferred embodiment, the ICU 24 is configured such that operation of the valves of the target processing system 22 is at least partly automated to achieve a safe and reliable operation of the target processing system.

More preferably, the instrumentation and control unit 24 may be configured to automatically control the pressure in the guide tubes 12, in particular after each insertion of irradiation targets 16 and/or positioning targets 18 by the target processing system 22.

Operation of the radionuclide generation system is preferably monitored and controlled at an operator station via a processing unit. The processing unit can be installed in a separate control cabinet in a control cabinet room (not shown). The processing unit is equipped with a display and, inter alia, allows for controlling specific parameters of the valves of the target processing system 22.

At the operator station the condition of the irradiation targets 16 during irradiation and the remaining irradiation time can be monitored. When the irradiation time of a set of targets 16 in an instrumentation tube 14 reaches the calculated time, a message prompts the operator to start the retrieval and harvesting process with respect to the selected instrumentation tube 14.

After each insertion of irradiation targets 16 and positioning targets 18 into the instrumentation tube 14, the pressure in the tube is checked and regulated in a fully automated manner. The ICU 24 also collects further digital signals representative of certain system conditions. Especially, the signals of the humidity sensors allow for a leakage monitoring such as ingress of primary coolant into the instrumentation tube system 12.

A load cabinet of the aero-ball measuring system may be adapted to provide the electric power for the components of the target processing system 22, including the valves and the processing unit in the control cabinet. An additional power inverter having appropriate fuses may be installed in the load cabinet. It is also possible to use an additional 24 volt supply provided in the control cabinet room.

Figure 2:
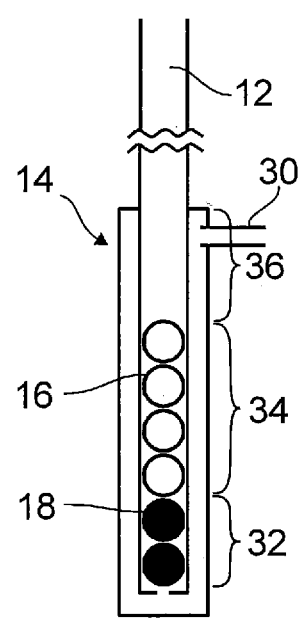
FIG. 2 shows an instrumentation tube filled partly with irradiation targets and partly with positioning targets.

With reference to FIG. 2, an instrumentation tube 14 or other aero-ball conduit penetrates a cover of the reactor pressure vessel. The instrumentation tube 14 extends from the top to the bottom over substantially the entire axial length of the reactor core 10. Irradiation targets 16 and optionally positioning targets 18 are inserted into the instrumentation tube 14 in a linear order to form a target column wherein each target 16, 18 is at a predefined axial position. The instrumentation tube 14 comprises a gas inlet port 30 at a top of the tube which is coupled to the target processing system 22.

Alternatively, it is also possible to insert the targets into the instrumentation tube 14 from a drywell at the bottom of the reactor core 10, for example if the TIP system of a boiling water reactor is connected to the target processing system 22. In this case, additional means for retaining the irradiation targets 16 and positioning targets 18 in the instrumentation tube 14 are provided.

The irradiation targets 16 are made of non-fissile material and comprise a suitable precursor material for generating radionuclides which are to be used for medical and/or other purposes. More preferably, the irradiation targets consist of the precursor material which converts to a desired radionuclide upon activating by exposure to neutron flux present in the core of an operating commercial nuclear reactor. Useful precursor materials are Mo-98, Yb-176 and Lu-176 which are converted to Mo-99 and Lu-177, respectively. It is understood, however, that the invention is not limited to the use of a specific precursor material.

The positioning targets 18 are made of an inert material which is not substantially activated under the conditions in the core 10 of an operating nuclear reactor. Preferably, the positioning targets can be made of inexpensive inert materials, and can have different magnetic properties than the irradiation targets. Preferably, the positioning targets 18 can be re-used after a short decay time so that the amount of radioactive waste is further reduced.

For use in a conventional aero-ball measuring system, the irradiation targets 16 and the positioning targets 18 have a round shape, preferably a spherical or cylindrical shape, so that the targets may slide smoothly through and can be easily guided in the guide tubes 12 of the aero-ball measuring system by pressurized gas, such as air or nitrogen, and/or under the action of gravity.

According to a preferred embodiment, the positioning targets 18 and the irradiation targets 16 have different magnetic properties. Preferably, either the positioning targets 18 or the irradiation targets 16 are magnetically attractable. More preferably, one of the irradiation targets 16 and the positioning targets 18 is ferromagnetic whereas the other one of the irradiation targets 16 and positioning targets 18 is non-magnetic or paramagnetic. Still more preferably, the positioning targets 18 are made from a ferromagnetic material such as iron or iron alloys, including ferritic stainless steel, or ferrite.

With the aid of the online core monitoring system 26 it is possible to determine sections 32, 36 of the instrumentation tube 14 in which the neutron flux is too low for producing radionuclides, and sections 34 where the neutron flux is above the required irradiation target demand and thus sufficient for producing the desired radionuclides.

In order to eliminate any waste of expensive irradiation targets 16, positioning targets 18 are provided and positioned preferably in the lower end section 32 of the irradiation tube 14 having a too low neutron flux density for radionuclide generation.

According to the embodiment shown in FIG. 2, the irradiation targets 16 are positioned above and are held in place by the positioning targets 18 in a center section 34 of the irradiation tube 14 where the neutron flux is sufficient to completely convert the irradiation targets into the desired radionuclides, as determined by the ICU 24 and/or the online core monitoring system 26.

In accordance with a preferred embodiment of the invention, an upper section 36 of the instrumentation tube 14 is kept empty.

In a commercial pressurized water reactor, section 34 of the instrumentation tube useful for radionuclide generation generally extends over about 3-4 meters, and the end sections 32, 36 extend over 0.5 to 1 meter. Depending on the nuclear fuel load the useful section 34 for activation of the irradiation targets 14 can vary in the core position. These values may vary according to the reactor type and the actual operation status of the reactor, and will be different for boiling water reactors, heavy water reactors and CANDU reactors, respectively.

In another embodiment (not shown), one or more of the irradiation targets 16 in the instrumentation tube 14 may be separated from each other by one or more positioning targets 18 thereby defining irradiation target subsections. The irradiation targets 16 in the irradiation target subsections preferably have the same or different material properties. More preferably, the irradiation targets 16 in adjacent subsections differ with respect to the precursor material used for radionuclide generation. This embodiment will enable the production of different radionuclides in a one-step operation.

The optimum positioning of the irradiation targets 16 by means of inexpensive positioning targets 18 in an instrumentation tube 14 of a commercial nuclear reactor provides an effective and economical production of radionuclides during reactor operation, and also avoids production of nuclear waste due to incomplete target activation.

Figure 3:
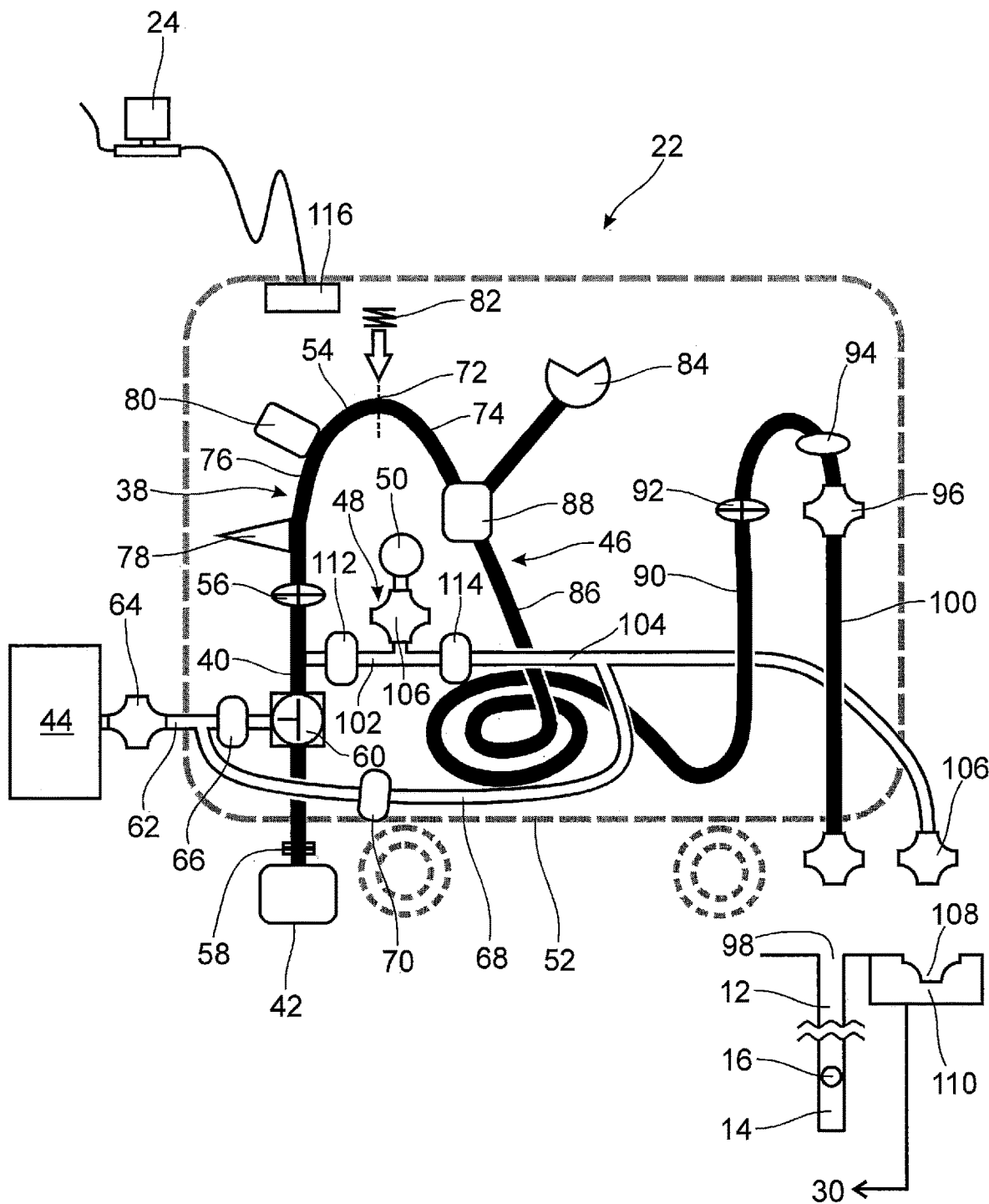
FIG. 3 shows a schematic sketch of a target processing system of the present invention.

The irradiation target processing system 22 of the present invention is schematically shown in FIG. 3.

Specifically, the target processing system 22 comprises a target retrieving system 38 having a target exit port 40 configured to be coupled to a target storage container 42 and an exhaust system 44 of the nuclear power plant, a target insertion system 46 configured to insert irradiation targets 16 into the instrumentation tube 14 and to guide activated irradiation targets 16 from the instrumentation tube 14 to the target retrieving system 38, and a transport gas supply system 48 configured to be coupled to a source 50 of pressurized gas and to drive the targets 16, 18 within the target processing system 22 into and out of the instrumentation tube 14 in the reactor core 10.

The target retrieving system 38, the target insertion system 46 and the transport gas supply system 48 are mounted on a movable support 52. The movable support 52 can be any movable system that is capable to be moved within an accessible area inside the nuclear reactor confinement. Preferably, the movable support 52 comprises a hand cart, or a motorized or electrically driven cart.

The exit port 40 of the target retrieving system 38 is linked to a discharge tube 54 having a lock element 56 for blocking movement of the activated irradiation targets 16 into the exit port 40. The lock element 56 can be a magnetically or mechanically operated restriction element, preferably a pin crossing the discharge tube 54.

The discharge tube 54 is configured to receive the irradiation targets 16 driven out of the instrumentation tube after activation is completed. The linear order of the irradiation targets 16 and/or the positioning targets 18 is retained in the discharge tube 54.

The exit port 40 is located at a free end of the discharge tube 54 adjacent the lock element 56 and has an exit port junction 58 for coupling to one of a number of storage containers 42. The storage container 42 is configured to receive the activated irradiation targets 16 retrieved from the instrumentation tube 14. The storage container 42 preferably has a shielding to minimize an operator's exposure to radiation from the activated irradiation targets 16.

A ball valve 60 is arranged in the exit port 40 of the target retrieving system 38. The ball valve 60 is configured for discharging gas out of the discharge tube 54, and for releasing the activated irradiation targets 16 from the discharge tube 54 through the exit port 40 into the storage container 42 under the action of gravity. An exhaust gas tube 62 is connected to the ball valve 60 and provided with an exhaust gas tube junction 64 for coupling to the external exhaust system 44 of the nuclear power plant. The exhaust gas tube 62 further comprises a shut-off valve 66 downstream of the ball valve 60.

The exhaust gas tube 62 may also comprise a bypass 68 which can be equipped with a further shut-off valve 70. The bypass conduit serves to provide pressure compensation when the irradiation targets 16 are driven into instrumentation tube 14. In this case, shut off 70 valve is open, and ball valve 60 and shut-off valve 66 are closed.

The discharge tube 54 is formed in the shape of an inverse U forming an apex 72 which divides the discharge tube 54 into a first section 74 proximate the exit port 40 and a second section 76 connected to the target insertion system 46 and the instrumentation tube 14.

The lock element 56 is provided in the first discharge tube section 74 near the exit port 40 to block movement of the activated irradiation targets 16 out of the discharge tube 54.

A sensor 78 for determining target activity or other target parameters is provided at the first discharge tube section 74 adjacent the lock element 56. The sensor 78 may have a collimator and is used for determining the presence of activated irradiation targets 16 vis-a-vis non-activated positioning targets 18. Further, the sensor 78 can be used for quality control of sufficient activation of the irradiation targets 16 and for runtime control of the activated targets 16 from the instrumentation tube 14 to the lock element 56 in order to indicate maintenance requirements. The sensor 78 may also be used to detect the amount of activated irradiated targets to be portioned accordingly into the transport gaskets. Preferably, sensor 78 may trigger the ball valve 60 to close after a sufficient amount of activity is detected in the irradiated targets 16 so as to prevent a further insertion of activated targets into storage container 42.

At least one magnet 80 is movably arranged at the first discharge tube section 74 for separating magnetic targets from non-magnetic targets. More preferably, the magnet 80 can be used to select and separate activated irradiation targets 16 from positioning targets 18 in the discharge tube 54. The at least one magnet 80 may be selected from a permanent magnet and a solenoid. Preferably, the at least one magnet 80 is movable along the first discharge tube section 74 so as to selectively expose ferromagnetic targets to a magnetic field and retain the ferromagnetic targets in the discharge tube 54.

The discharge tube 54 can be connected to a vibrator 82 for releasing blocked irradiation targets 16 and/or to remove particulate matter such as abrasive dust. Preferably the vibrator 82 engages the discharge tube 54 near the apex 72.

The second discharge tube section 76 connects the target retrieving system 38 to the target insertion system 46. The target insertion system 46 comprises a target filling device 84, a target retention tubing 86 and a target diverter 88.

The target diverter 88 is coupled to target retrieving system 38 via the second discharge tube section 76. The target filling device 84 is configured to provide a source of irradiation targets 16 and/or positioning targets 18 which are to be inserted in the instrumentation tube 14, and is also coupled to the target diverter 88. The target filling device 84 may comprise a funnel equipped with a vibrator or stirrer and containing irradiation targets or positioning targets, or a cartridge containing a prearranged target column (not shown).

The target retention tubing 86 is adapted to accommodate all irradiation targets 16 inserted into or retrieved from the instrumentation tube 14. At one end thereof, the target retention tubing 86 comprises an ascending tube section 90 and a locking element 92 at an upper end of the ascending tube section 90 for blocking movement of the irradiation targets 16 into the instrumentation tube 14. At an end opposed to the ascending tube section 90, the target retention tubing 86 is connected to the target diverter 88.

The target diverter 88 is configured as a switch to select between a passageway from the target filling device 84 to the retention tubing 86, and a passageway from the retention tubing 86 to the discharge tube 54.

One or more sensors 94 can be provided at the target retention tubing 86, and preferably at the ascending tube section 90, to determine at least one of target activity, target transport time, target quantity and target magnetic properties.

Preferably, the one or more sensors 94 are provided for monitoring the presence and runtime of the irradiation targets 16 and optionally the positioning targets 18 passing through the guide tubes 12, and into and out of the instrumentation tube 14. The measuring principle may be based on the detection of a variation of the magnetic flux as the irradiation targets 16 and/or the positioning targets 18 pass by the sensors 94 for measuring transport time and completeness of conversion to radioactive nuclides. Still preferably, the sensors 94 are used to monitor that all irradiation targets 16 have left the instrumentation tube 14 during the removal process while the targets pass the sensors 94. In addition, or as an alternative, the sensor 94 may be an activity sensor used for detecting the radiation dose of the irradiation targets 16 and/or the positioning targets 18.

A target supply junction 96 is provided at the end of the target retention tubing 86 opposed to the target diverter 88, proximate the locking element 92 in the ascending tube section 90. The target supply junction 96 is configured to be coupled to an opening 98 of the guide tube 12 heading to the instrumentation tube 14. The opening 98 of the guide tube 12 is formed at the end of a guide tube of the aero-ball measuring system which is adapted to receive and guide aero-balls as well as irradiation targets 16 to the instrumentation tube 14 in the reactor core 10. A connecting tube 100 can be used to provide a passageway between the target supply junction 96 and the guide tube opening 98 of the aero-ball measuring system.

The transport gas supply system 48 comprises a first gas supply tubing 102, a second gas supply tubing 104 and a transport gas supply junction 106 coupled to the first and second gas supply tubing 102, 104.

The first gas supply tubing 102 of the transport gas supply system 48 is coupled to the exit port 40 of the target retrieving system 38, and is configured to supply pressurized gas for transporting activated irradiation targets 16 from the discharge tube 54 into the retention tubing 86, and for transporting irradiation targets 16 from the retention tubing 86 into the instrumentation tube 14 for radionuclide generation. The first gas supply tubing 102 connects to the exit port 40 upstream of the ball valve 60, adjacent lock element 56 of discharge tube 54.

The second gas supply tubing 104 of the transport gas supply system 48 has a junction 108 configured to be coupled to a valve battery 110 of the aero-ball measuring system, and is used to provide pressurized gas to the gas inlet port 30 of instrumentation tube 14 for blowing activated irradiation targets 16 out of the instrumentation tube 14 and passing the activated irradiation targets 16 into the retention tubing 86 and/or the discharge tube 54.

The transport gas supply junction 106 is configured for connecting to the source 50 of pressurized gas such as a compressed gas cylinder or an external pressurized gas supply of the nuclear power plant, such as the gas supply of an existing aero-ball measuring system.

Shut-off valves 112, 114 are provided in the first and second gas supply tubing 102, 104 which serve to block any gas supply to the irradiation target processing system 22, and which may also be used to switch between target insertion and target retrieving operations.

The irradiation target processing system 22 further comprises an electronic interface 116 which is coupled to the instrumentation and control unit 24 and/or the core monitoring system 26 for monitoring and controlling operation of the system components.

Figure 4:
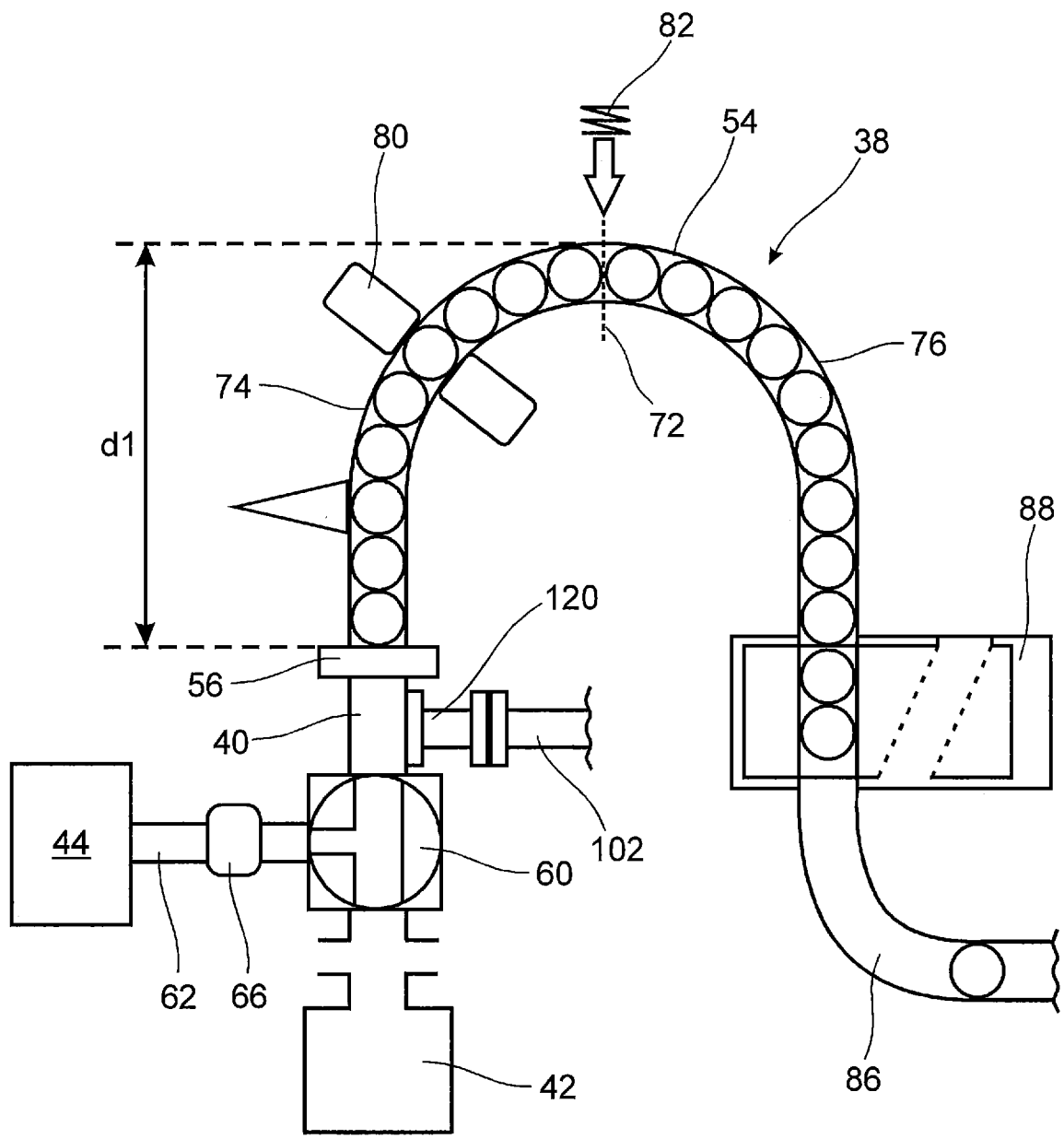
FIG. 4 shows a schematic sketch of a target retrieving subsystem.

FIG. 4 illustrates the target retrieving system 38 in greater detail. The discharge tube 54 is shaped in the form of an inverse U and comprises the first discharge tube section 74, the second discharge tube section 76 and the apex 72 formed at a conjunction of the first and second discharge tube section 74, 76. The apex 72 is the highest point of the discharge tube 54. The first and second discharge tube sections 74, 76 are directed downwardly from the apex 72. Other profiles of the discharge tube 54 are possible as long as the apex 72 formed between the first and second discharge tube section 74, 76 has a radius which is sufficiently small to effectively separate the target columns in the first and second tube sections 74, 76 from each other.

A distance d1 between the lock element 56 and the apex 72 corresponds to a height of the target column in the first discharge tube section 74. The second discharge tube section 76 communicates with the retention tubing 86 formed as a helix so that the targets in the second discharge tube section 76 may therefore have a higher mass than the total of the target column in the first discharge tube section 74. The mass difference assists the effect of the apex 72 and facilitates separation of the targets under action of gravity without using any further mechanical means.

A gas inlet port 120 is located downstream the lock element 56 in the exit port 40, wherein the gas inlet port 120 is coupled to first gas supply tubing 102 for supplying pressurized gas into the discharge tube 54. The pressurized gas can be supplied from a gas cylinder mounted so that the target processing system 22 can be operated as a stand-alone system with no substantial modification of the regular aero-ball measurement system.

The exit port 40 is arranged at a free end of the first discharge tube section 74, opposed to the apex 72, and the second discharge tube section 76 is coupled to the diverter 88 providing a passageway towards retention tubing 86 and instrumentation tube 14.

The exit port 40 comprises the ball valve 60 for facilitating release of the activated irradiation targets 16 into the storage container 42 and eliminating the generation of aerosols. Exhaust gas tube 62 connects the ball valve 60 to the external exhaust system 44 of the nuclear power plant. Shut-off valve 66 is provided in the exhaust gas tube 62 so that the target retrieval system 22 can be separated from the exhaust system 64, if desired.

Figure 5A:
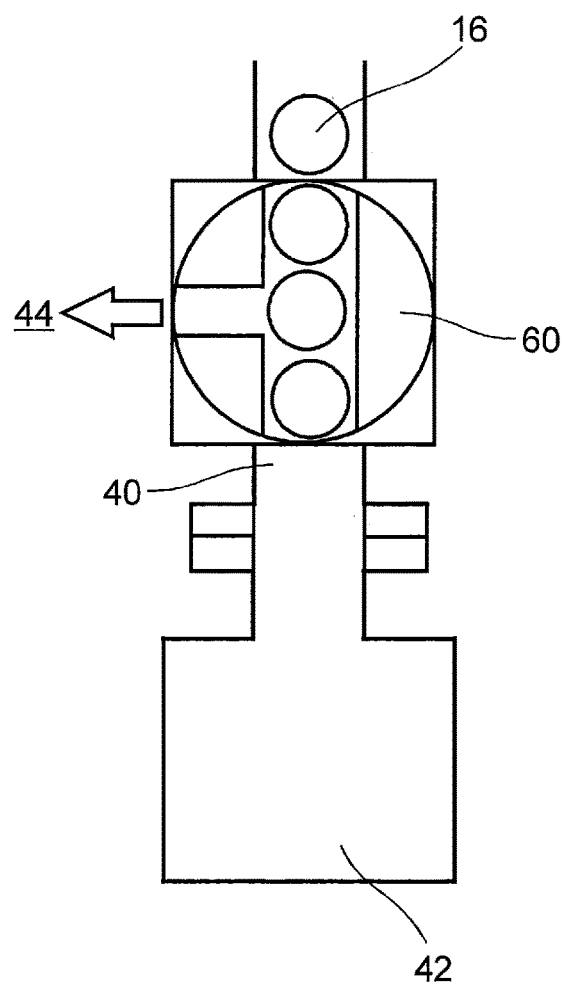
FIG. 5 shows a schematic sketch of a ball valve used in the target retrieving subsystem.
Figure 5B:
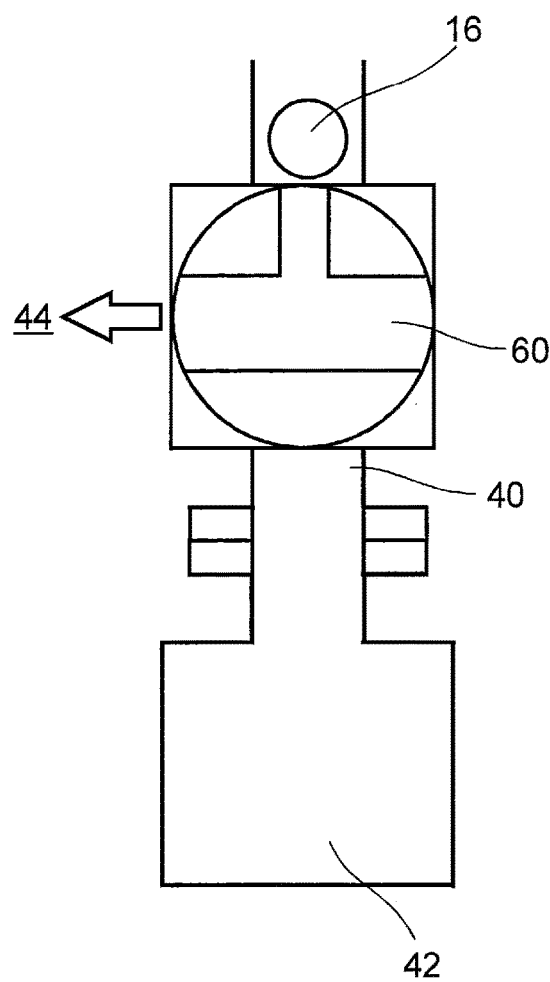

As shown in FIG. 5a, the ball valve 60 is configured to provide an open position wherein the activated irradiation targets 16 can flow through the ball valve 60 under action of gravity into the storage container 42 connected to the exit port 40. In addition, the ball valve 60 provides an open passageway to the exhaust system 44 via exhaust gas tube 62. FIG. 5b shows the ball valve 60 in a closed position which is used when irradiation targets 16 are transported from the discharge tube 54 back into the retention tubing 86, or from the retention tubing 86 into the instrumentation tube 14 in the reactor core 10. In this case, shut-off valve 66 is closed to separate the irradiation target processing system 22 from exhaust system 44. The ball valve 60 in closed position also enables a purging of the system 22 with pressurized gas, preferably nitrogen, for maintenance works. In this case, shut-off valve 66 is opened, and the purging gas is vented into exhaust system 44.

Figure 6:
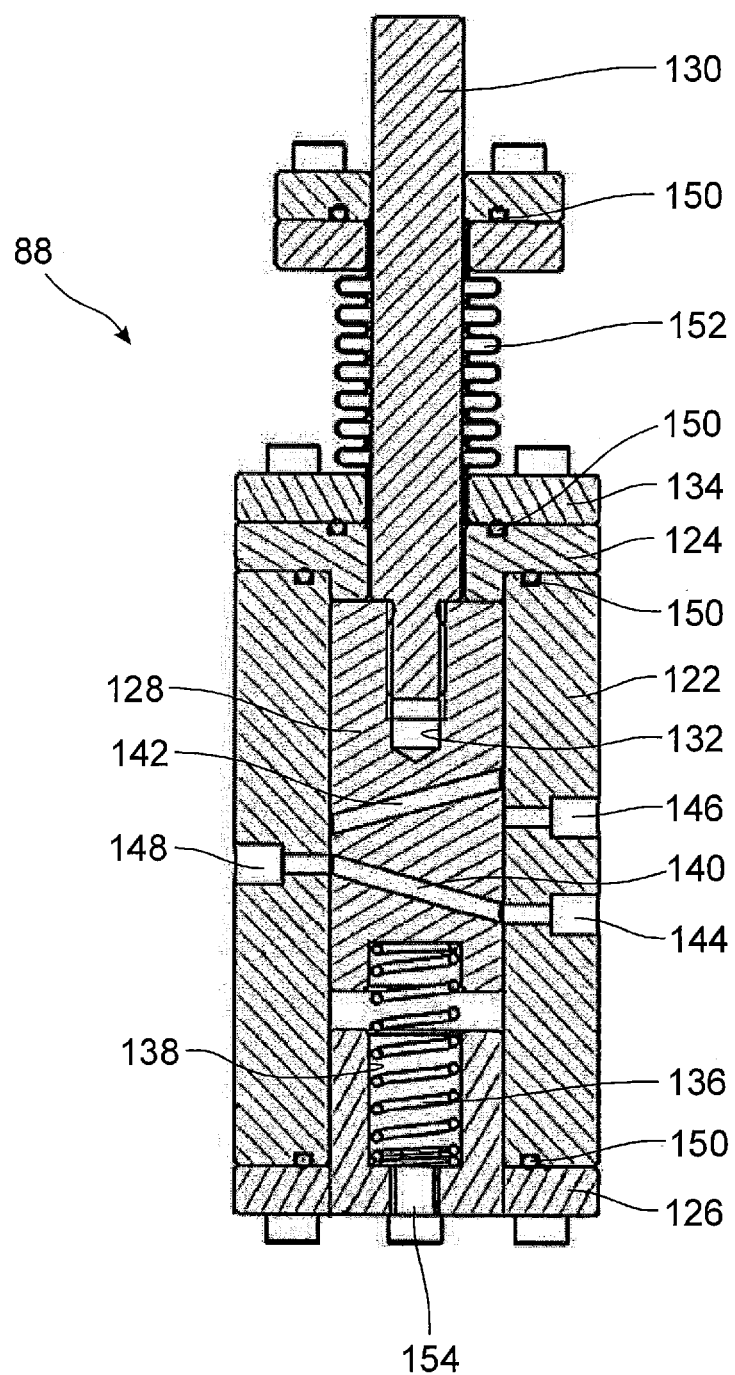
FIG. 6 shows a schematic sketch of a target diverter.

FIG. 6 is a cross-section of the target diverter 88 used in target insertion system 46. Target diverter 88 comprises a cylindrical housing 122 having covers 124, 126 at opposing ends of the cylindrical housing 122. A movable plunger 128 is provided inside the housing 122, and is operated by plunger rod 130 extending through cover 124 and engaging in a recess 132 in plunger 128. Plunger rod 130 is fixed to cover 124 by flange. Plunger rod 130 can be operated by electrical, mechanical or pneumatic actuation.

Plunger 128 is biased against a spring 136 housed in a recess 138 provided in cover 126. Thus, plunger 128 can be moved between two positions by actuating plunger rod 130 wherein the plunger 128 is abutting cover 124 in the first position, and abutting cover 126 in the second position.

Plunger 128 is provided with two radial bores 140, 142 extending through the plunger 128. Housing 122 has two openings 144, 146 in its lateral area which are adjacent to each other and which can be brought in an alignment with the radial bores 140, 142 in plunger 128 alternatively, when the plunger 128 is in the first or in the second position. Opposite to the two openings 144, 146 in the housing, there is provided a single opening 148 which is in alignment with one of the radial bores 140 in plunger 128 when the plunger 128 is in the first position, and is in alignment with the other of the bores 142 when the plunger 128 is in the second position.

Therefore, movement of the plunger 128 between the first and second position provides a switch between two different passageways. When used in the target insertion system 46, the single opening 148 is connected to target retention tubing 86. One of the openings 146 opposite the singe opening is connected to the target filling device, and the other one of the openings 144 is connected to the discharge tube.

Sealing rings 150 are provided between covers 124, 126 and housing 122, and between flange 134 and cover 124 to provide hermetically tight sealing of housing 122. A pair of bellows 152 is provided to further seal plunger rod 130 pressure-tight against housing 122. The clearance between plunger 128 and housing 122 is adapted to act as a restrictor decreasing the pressure inside the housing 122 and prevent pressure increase in the blocked passageway. A vent opening 154 provided in cover 126 is also used to reduce pressure inside the housing 122. Vent opening 154 can be connected to the exhaust system (not shown).

Figure 7:
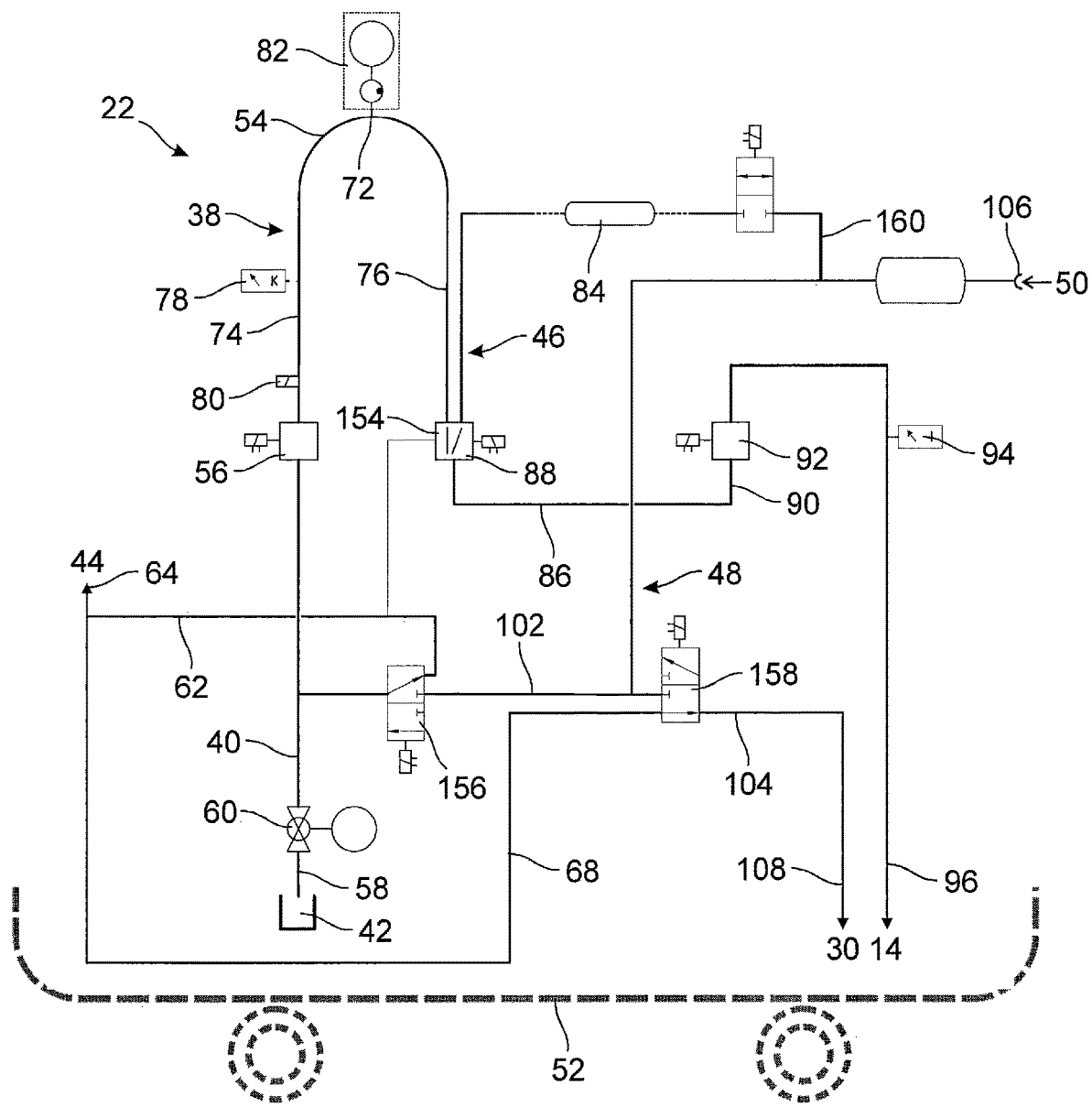
FIG. 7 shows an alternative set-up of the target processing system.

FIG. 7 shows an alternative set-up of the irradiation target processing system 22 of FIG. 3 wherein shut-off valves 66 and 112 are replaced by a 3/2 directional control valve 156, and shut-off valves 70 and 114 are replaced by a 3/2 directional valve 158.

Gas source 50 is a valve battery of an existing aero-ball measuring system, and transport gas supply junction 106 is configured to be connected to the valve battery.

Directional control valve 156 connects first gas supply tubing 102 to exit port 40 and exhaust tube 62 which is heading to the external exhaust system 44. Directional control valve 158 connects the second gas supply tubing 104 to first gas supply tubing 102 and bypass conduit 68 which is heading to exhaust system 44.

Target filling device 84 is configured as a cartridge filled with irradiation targets 16 and/or positioning targets 18, which is connected to gas source 50 via gas supply line 160 including valve 162. For starting a new radionuclide generation cycle, the cartridge including the irradiation targets and/or positioning targets can be mounted to the system prior to retrieving activated irradiation targets from instrumentation tube 14 in reactor core 10, and valve 162 is opened so as to pneumatically drive the irradiation targets 16 and/or positioning targets 18 from the filling device 84 into instrumentation tube 14 in reactor core 10.

The operation of the of the irradiation target processing system 22 of the invention is now described in greater detail below.

The radionuclide generation process is started by moving the irradiation target processing system 22 from a storage facility to the desired access point within the reactor confinement.

The target exit port 40 is coupled to the external exhaust system 44 through ball valve 60 and exhaust gas tube 62. One of a plurality of instrumentation tubes 14 is selected for radionuclide generation depending on reactor status and neutron flux conditions at the selected instrumentation tube 14. The target supply junction 96 is coupled to the opening 98 of the guide tube 12 heading to the selected instrumentation tube 14.

Further, the transport gas supply junction 106 is connected to a source 50 of pressurized gas, such as a gas cylinder, and the second gas supply tubing 104 is connected to the gas inlet port 30 of the instrumentation tube 14 through junction 108 and valve battery 110 of the aero-ball measuring system.

Irradiation targets 16 and/or positioning targets 18 from target filling device 84 are inserted into the instrumentation tube 14 by passing the targets into retention tubing 86 under action of gravity or pressurized gas from gas source 50. Target diverter 88 is in a position to provide an open passageway between filling device 84 and retention tubing 86. The targets 16, 18 are driven out of retention tubing 86 and inserted into instrumentation tube 14 by blowing pressurized gas through first gas supply tube 102 and discharge tube 54. In this step, shut-off valve 112 in first gas supply tube 102 is open and shut-off valve 114 in second gas supply tube 104 is closed. Also, ball valve 60 and shut-off valve 66 in exhaust gas tube are in closed position. Shut-off valve 70 in bypass conduit 68 is open to allow for pressure compensation in the guide tube 12.

Irradiation targets 16 are activated by exposure to neutron flux in the nuclear reactor core 10 when the reactor is in power generating operation to convert the precursor material of the irradiation target 16 into the desired radionuclide.

The positioning targets 18 and the irradiation targets 16 are arranged in the instrumentation tube 14 in a pre-calculated linear order such that the positioning targets 18 hold the irradiation targets 16 at a predetermined axial position in the reactor core 10. The optimum axial position of the irradiation targets 16 is calculated by the ICU 24 and/or the online core monitoring system 26 and corresponds to a neutron flux density sufficient for completely converting the irradiation targets 16 to the radionuclide during a predetermined period of time. The remaining positions in the instrumentation tube 14 are occupied by the positioning targets 18 which hold the irradiation targets 16 in place.

The irradiation targets 16 are preferably positioned in a center section 34 of the instrumentation tube 14 in the reactor core 10, and the positioning targets 18 are preferably positioned in an end section 32 of the instrumentation tube 14, i. e., in the lower part of the reactor core 10 where the neutron flux density is insufficient for completely activating the irradiation targets 16 (cf. FIG. 2). As shown in FIG. 2, the space above the irradiation targets 16 in the upper section 36 can remain empty.

The irradiation targets 16 are activated in the instrumentation tube 14 for a period of time sufficient for complete conversion of the precursor material of the irradiation targets to the desired radionuclide, as determined by the online core monitoring system 26 and instrumentation and control system 24. The time to achieve complete conversion of the precursor material will depend on the reactor type and status, neutron flux conditions, type of precursor material and various other parameters known to a person skilled in the art, and may range from several hours to days, or until saturation of activity. Complete conversion means a conversion rate of the precursor material providing a radionuclide content suitable for medical or industrial application of the irradiation targets 16.

After activation of the irradiation targets 16 and conversion to the desired radionuclide is completed, the target processing system 22 is operated again to force the positioning targets 18 and the activated irradiation targets 16 out of the instrumentation tube 14 into the retention tubing 86 and further into discharge tube 54. Pressurized gas such as nitrogen or air is supplied to gas inlet port 30 of the instrumentation tube 14 by passing pressurized gas through second gas supply tubing 104 and junction 108 into the gas inlet port 30 of instrumentation tube 14. In this step, target diverter 88 is in a position to provide an open passageway between discharge tube 54 and retention tubing 86. Shut-off valve 112 in first gas supply tubing 102 is closed, and shut-off valve 114 in second gas supply tubing 104 is open. Ball valve 60 is still in closed position, and shut-off valve 66 in exhaust gas tube 62 is open to allow any aerosols to leave the irradiation target processing system 22 and enter exhaust system 44.

A storage container 42 with appropriate radiation shielding is coupled to the exit port 40, preferably prior to retrieving the activated irradiation targets 16 from instrumentation tube 14.

The linear order of the positioning targets 18 and the irradiation targets 16 in the instrumentation tube 14 is preserved in the discharge tube 54 so that the irradiation targets 16 are located proximate to the exit port 40 of the discharge tube 54. The positioning targets 18 are at a distal end of the target column in the discharge tube 54 and/or retention tubing 86.

At this time, the discharge tube 54 is blocked by lock element 56 providing a stop for the targets 16, 18 and preventing the activated irradiation targets 16 and positioning targets 18 from leaving the discharge tube 54.

Shut-off valve 114 in second gas supply tubing 104 is then closed and the pressure in the irradiation target processing system 20 is relieved into exhaust system 44.

The irradiation targets 16 entering the discharge tube 54 are passed over the apex 72 formed at the conjunction between the first and second discharge tube section 74, 76. A pre-defined quantity of the activated irradiation targets 16 is located in the first discharge tube section 74, proximate to the exit port 40. The quantity of the irradiation targets 16 in the first discharge tube section 74 directly corresponds to the length of the first discharge tube section 74 between the lock element 56 and the apex 72.

The ball valve 60 and the lock element 56 are then opened so as to release the pre-defined quantity of the activated irradiated targets 16 located on one side of the apex 72 in the first discharge tube section 74 and pass the targets 16 into the shielded storage container 42 coupled to the exit port 40, under action of gravity. Shut-off valve 66 in exhaust gas tube 62 is still open so that any aerosols are emitted into exhaust system 44. Shut-off valve 70 in bypass conduit 68 and shut-off valve 114 in second gas supply tubing 104 are closed.

The other quantity of activated irradiation targets 16 and positioning targets 18 cannot pass the apex and are kept in the discharge tube 54 or may flow back into retention tubing 86, under action of gravity. Ball valve 60 and lock element 56 are closed, and the targets 16, 18 are driven back into retention tubing 86 by passing pressurized gas through first gas supply tubing 102 and discharge tube 54. In this step, shut-off valve 112 in first gas supply tubing 102 is open, and ball valve 60 is in closed position. Target diverter 88 is still in a position to provide an open passageway between discharge tube 54 and retention tubing 86. Lock element 92 at the end of retention tubing 86 is closed to prevent the activated irradiation targets 16 from re-entering the instrumentation tube 14 in reactor core 10.

For removing container 42, the ball valve 60 at the exit port 40 remains closed for providing a pressure-tight sealing of the exit port 40 from discharge tube 54, and the shielded storage container 42 is removed either manually or by means of an automated handling device.

An empty storage container 42 is then coupled to exit port 40, and the above process steps are repeated, starting with forcing the targets 16, 18 out of retention tubing 86 by supplying pressurized gas to gas inlet port 30, for portioning and harvesting further quantities of activated irradiation targets 16 from the retention tubing 86.

When sensors 78, 94 at the retention tubing 86 or discharge tube 54 indicate the presence of positioning targets 18 and irradiation targets 16 in the first discharge tube section 74, the positioning targets 18 and/or the activated irradiation targets 16 are exposed to a magnetic field to retain either the positioning targets 18 or the activated irradiation targets 16 in the first discharge tube section 74 and release the other one of the activated irradiation targets 16 or the positioning targets 18 from the first discharge tube section 74 through the exit port 40 into storage container 42 or an intermediate storage container adapted for receiving positioning targets (not shown).

For separating the irradiation targets 16 from the positioning targets 18 and selectively removing the irradiation targets 16 from the first discharge tube section 74, the magnets 80 are moved along the longitudinal axis of the first discharge tube section 74 and arranged adjacent to the ferromagnetic positioning targets 18 so that one or more positioning targets 18 proximate to the exit port 40 are associated to and exposed to the magnetic field of magnet 80.

The lock element 56 is then opened, and the non-magnetic irradiation targets 16 are released from the first discharge tube section 74 under the action of gravity and passed into the storage container 42 for further processing and/or shipping to an application site. The magnetic positioning targets 18 are kept in the first discharge tube section 74 by the action of the magnetic field generated by the magnets 64.

After the irradiation targets 16 are separated from the positioning targets 18 and are harvested in storage container 42, the exit port 40 is coupled to the intermediate storage container, the magnetic field is switched off and the positioning targets 18 are transferred to the intermediate container under the action of gravity for further use after a short decay period. The positioning targets 18 kept in the second discharge tube section 76 and/or retention tubing 86 can be forced out of the discharge tube 54 into the intermediate storage container using pressurized gas supplied through second gas supply tubing 104.

Alternatively, some or all of the positioning 18 targets can be driven back into retention tubing 86 or instrumentation tube 14 by closing ball valve 60 at the exit port 40 and blowing pressurized gas through first gas supply tubing 102 into the gas inlet port 56 at the exit port.

This procedure can also be used if magnetic targets are positioned upstream of non-magnetic targets, and are held by magnets 80 in the first discharge tube section 102 proximate lock element 56. The non-magnetic targets located downstream of the magnetic targets are then driven over apex 72 back into retention tubing 86 by means of pressurized gas while the magnetic targets remain in the first discharge tube section 102.

A new radionuclide generation cycle can then be started by inserting fresh irradiation targets 16 and/or positioning targets 18 into instrumentation tube 14.

In a preferred embodiment, instrumentation tube 14 used for radionuclide generation is changed by coupling the second gas supply tubing 104 and the target supply junction 96 to another one of the multiple instrumentation tubes 14 extending into the reactor core, and a second step of radionuclide generation is performed using the other instrumentation tube 14. The instrumentation tube 14 used for the first step of radionuclide generation can then be used for neutron flux measurement. Thus, a more reliable information about reactor status and neutron flux conditions can be obtained.

It is understood that the above target portioning and harvesting process will also be applicable vice-versa if the positioning targets 18 are non-magnetic and the irradiation targets 16 are ferromagnetic.

The radionuclide generation method and target processing system 22 according to the invention can also be used in a nuclear power plant having no conventional aero-ball measuring system, but using other instrumentation for in-core measurements. The target processing system of the present invention does not require installation of additional instrumentation tubes, guide tubes and the like only for radionuclide generation, but is provided as a stand-alone system which can be connected to existing in-core measuring facilities. Possible reactor types for such an application include pressurized water reactors, boiling water reactors, heavy water reactors and CANDU (CANada Deuterium Uranium) reactors.

The invention claimed is:

1. An irradiation target processing system for insertion and retrieving irradiation targets into and from an instrumentation tube in a nuclear reactor core, the system comprising:
    a target retrieving system comprising a target exit port configured to be coupled to a target storage container and an exhaust system;
    a target insertion system comprising a target filling device, a target retention tubing, a target diverter coupled to the target filling device, the target retention tubing and the target retrieving system, and a target supply junction at the target retention tubing, wherein the target supply junction is configured to be connected to the instrumentation tube; and
    a transport gas supply system comprising a first gas supply tubing, a second gas supply tubing, and a transport gas supply junction coupled to the first and second gas supply tubing, wherein the first gas supply tubing is coupled to the exit port of the target retrieving system, and the second gas supply tubing is configured to be coupled to a junction for supplying gas to the instrumentation tube; and
    wherein the target retrieving system, the target insertion system, and the transport gas supply system are mounted on a movable support.

2. The target processing system according to claim 1, wherein the target retrieving system comprises a discharge tube having a lock element for blocking movement of the irradiation targets into the exit port.

3. The target processing system according to claim 2, wherein the discharge tube is formed as an inverse U.

4. The target processing system according to claim 2, wherein the discharge tube comprises a sensor to determine target activity.

5. The target processing system according to claim 2, wherein the target retrieving system comprises a magnet movably arranged at the discharge tube for separating magnetic targets from non-magnetic targets.

6. The target processing system according to claim 2, wherein the discharge tube is connected to a vibrator for releasing blocked irradiation targets.

7. The target processing system according to claim 2, wherein the target retention tubing comprises a sensor to determine at least one of target activity, target transport time, target quantity and/or target magnetic properties.

8. The target processing system according to claim 1, wherein the exit port comprises a ball valve coupled to first gas supply tubing and the exhaust system.

9. The target processing system according to claim 8, wherein an exhaust gas tube is connected to the ball valve and the exhaust system, and comprises a shut-off valve downstream of the ball valve.

10. The target processing system according to claim 1, wherein the target insertion system comprises a target retention tubing adapted to accommodate all irradiation targets retrieved from the instrumentation tube.

11. The target processing system according to claim 10, wherein the target retention tubing comprises an ascending tube section and a locking element at an upper end of the ascending tube section for blocking movement of the irradiation targets into the instrumentation tube.

12. The target processing system according to claim 1, wherein the transport gas supply system comprises a compressed gas cylinder connected to the transport gas supply junction.

13. The target processing system according to claim 1, wherein the first and second gas supply tubing each comprise a shut-off valve.

14. The target processing system according to claim 1, wherein the first and second gas supply tubing each comprise a directional control valve.

15. The target processing system according to claim 14, wherein the first and second gas supply tubing each comprise a 3/2 directional control valve.

16. The target processing system of claim 14, wherein the directional control valve in the first gas supply tubing connects the first gas supply tubing to the exit port and an exhaust tube heading to the exhaust system.

17. The target processing system according to claim 16, wherein the directional control valve in the second gas supply tubing connects the second gas supply tubing to a bypass conduit heading to the exhaust system and the first gas supply tubing.

18. The target processing system according to claim 14, wherein the directional control valve in the second gas supply tubing connects the second gas supply tubing to a bypass conduit heading to the exhaust system and the first gas supply tubing.

19. The target processing system according to claim 1, further comprising an instrumentation and control unit to monitor and control operation of system components.

* * * * *